United States Patent
Plath et al.

(10) Patent No.: US 7,575,528 B2
(45) Date of Patent: Aug. 18, 2009

(54) CONTINUOUSLY VARIABLE TRANSMISSION

(75) Inventors: Detlef Plath, Meckenbeuren (DE); Uwe Firzlaff, Uhldingen-Mühlhofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 621 days.

(21) Appl. No.: 10/993,211

(22) Filed: Nov. 19, 2004

(65) Prior Publication Data

US 2005/0181899 A1 Aug. 18, 2005

(30) Foreign Application Priority Data

Nov. 21, 2003 (DE) ................. 103 54 157

(51) Int. Cl.
*F16H 55/56* (2006.01)

(52) U.S. Cl. ........................... 474/46; 474/28

(58) Field of Classification Search ................. 267/160, 267/158, 159; 474/46, 18, 28
See application file for complete search history.

(56) References Cited

U.S. PATENT DOCUMENTS

| | | | |
|---|---|---|---|
| 4,196,859 A * | 4/1980 | Trott et al. | ................ 239/677 |
| 4,919,643 A | 4/1990 | Fuss et al. | |
| 6,589,126 B1 | 7/2003 | Müller et al. | |
| 7,014,583 B2 * | 3/2006 | Diosi et al. | ................ 474/12 |
| 2003/0216200 A1 | 11/2003 | List | |
| 2003/0232676 A1 | 12/2003 | Diosi et al. | |

FOREIGN PATENT DOCUMENTS

| | | |
|---|---|---|
| DE | 38 16 357 C1 | 5/1989 |
| DE | 100 52 471 A1 | 3/2002 |
| DE | 102 22 001 A1 | 11/2003 |
| DE | 102 26 861 A1 | 1/2004 |
| GB | 1 200 668 | 7/1970 |

* cited by examiner

*Primary Examiner*—Richard W L Ridley
*Assistant Examiner*—Terence Boes
(74) *Attorney, Agent, or Firm*—Davis & Bujold, P.L.L.C.

(57) ABSTRACT

A continuously variable transmission having an input cone pulley pair and an output cone pulley pair linked by and an encircling mechanism. One pulley of each pair is axially fixed and one pulley is axially displaceable to control the transmission ratio of the transmission. A recoil spring engages between the input moveable pulley and an axially fixed contact surface only when the transmission is in the low transmission ratio range for exerting a force to displace the input moveable cone pulley to a high transmission ratio to avoid damage to the transmission or starting clutch during towing.

10 Claims, 4 Drawing Sheets

CONTINUOUSLY VARIABLE TRANSMISSION

This application claims priority from German Application Serial No. 103 54 157.8 filed Nov. 21, 2003.

FIELD OF THE INVENTION

The invention relates to a cone pulley continuously variable transmission.

BACKGROUND OF THE INVENTION

In a transmission of this kind, the ratio is determined by the situation of the input-side and output-side tread radii of the encircling means on the cone pulleys, the same as the change thereof produced by an axial displacement of axially displaceable cone pulleys. The needed contact and adjusting forces of the cone pulleys are hydraulically applied by adequate setting devices. In the operation of the transmission, the hydraulic pressures are composed of one static and one dynamic portion; the dynamic portion being produced by centrifugal force action upon the hydraulic pressure medium enclosed in the setting device and rotating together with the cone pulleys.

In these transmissions, the pressure medium is usually supplied by way of an oil pump mechanically driven by a prime mover of the vehicle. Failure of the prime mover caused by damage then results in that no sufficiently high static hydraulic pressure exists. A purposeful actuation of a starting clutch or of the hydraulic setting devices is thus no longer possible for the transmission ratio. Particularly in the towing operation of such a vehicle, the problem arises that in the pressure chambers of said setting devices, the same as of the input-side starting clutch, the existing pressure medium is exposed to centrifugal forces which can lead to the adjustment of an undesired transmission ratio and/or to closing of the starting clutch.

Besides, said cone pulley transmission are usually designed so that upon the axially displaceable cone pulley of the transmission output or secondary shaft, one coil spring acts by which a minimum contact pressure is ensured on the encircling means. Due to the action of said coil spring, during pressureless shut off of the vehicle and of the transmission, there appears a LOW ratio or underdrive in direction of the lowest transmission ratio.

Mainly in case of cone pulley transmissions having a starting clutch on the side of the primary shaft, i.e., a starting clutch located between the prime mover and the input shaft of the transmission, during a towing operation, there occurs the effect that the cone pulley pairs are, as it were, driven by the vehicle driving wheels via the output shaft of the transmission. In said transmission ratio LOW, this results in very high rotational speeds and drag torques on the input or primary cone pulleys which can produce a skidding of the encircling means, the same as mechanical damages on the encircling means and on the cone pulleys.

To solve this mechanical problem, from DE 100 52 471 A1 is known a cone pulley CVT where a plate spring having a special spring characteristic line is operatively situated upon the axially displaceable primary cone pulley. This characteristic line is selected so as to have, in the area of the transmission ratio LOW, a minimum force and in direction to lower reduction ratios to rise up to a maximum spring tension. Shortly before the reduction ratio 1:1, the spring tension drops to a zero value and is in the so-called overdrive range absolutely inactive. It should be advantageous in this design that when the vehicle is shut off with a transmission reduction ratio 1:1, the spring characteristic line prevents its moving in direction to LOW in the absence of static hydraulic pressure.

It is deemed disadvantageous in this CVT that the reduction ratio, departing from the reduction ratio LOW at the start of a towing operation, is adjusted comparatively slow out of the damaging rotational speed range so that an abnormal closing of the primary-side starting clutch, the same as damages on the encircling means and on the cone pulleys, cannot be ruled out with certainty.

With this background, the problem on which the invention is based is to introduce a cone pulley CVT which exclusively, as a result of its mechanical design, ensures that during the towing operation no disadvantageously high rotational speeds and drag torques are generated on the primary side of the transmission.

SUMMARY OF THE INVENTION

The invention is accordingly based on a cone pulley CVT having one primary cone pulley pair on the input side, one secondary cone pulley pair on the output side and one encircling means spanning said cone pulley pairs, in which the distances between the cone pulleys of each cone pulley pair are adjustable in opposite directions for ratio change by way of hydraulic setting devices, in which a spring device acts upon an axially displaceable secondary cone pulley and in which a spring device is provided which prestresses the input-side primary cone pulley pair in case of great distance of its cone pulleys in direction to reduction of the distance.

To solve the stated problem, it is provided in combination with the above mentioned features, that the spring tensions of the input-side spring device and of the output-side spring device be coordinated so that during a towing operation with deactivated hydraulic pressure supply, there is prevented a closing of an input-side starting clutch caused by rotational speed or drag torque or damage of the primary cone pulleys and/or of the encircling means.

It is preferably provided here that the input-side spring device be not axially prestressed but fixed on the axially displaceable primary cone pulley. The input-side spring device can be designed as a plate spring or as a coil spring.

As long as a coil spring is used as a primary-side device, this development of the invention is based on a cylinder-side section of the primary cone pulley and of the inner side of a pressure cylinder associated with said primary cone pulley.

For the case that a plate spring is used, this is preferably limited in its axial spring stroke. The spring stroke is limited preferably by a guard ring situated on a bearing section or a guide section of the axially displaceable primary cone pulley and inserted in an annular groove on the bearing section or on the guide section.

In one other development of the invention, it is provided that the axially displaceable primary cone pulley with its bearing section and its guide section be accommodated in the pressure cylinder which has a contact section on which the plate spring can support itself for adjusting a reduction ratio having no hydraulic pressure.

BRIEF DESCRIPTION OF THE DRAWINGS

The invention will now be described, by way of example, with reference to the accompanying drawings in which.

DETAILED DESCRIPTION OF THE INVENTION

Figure 1:
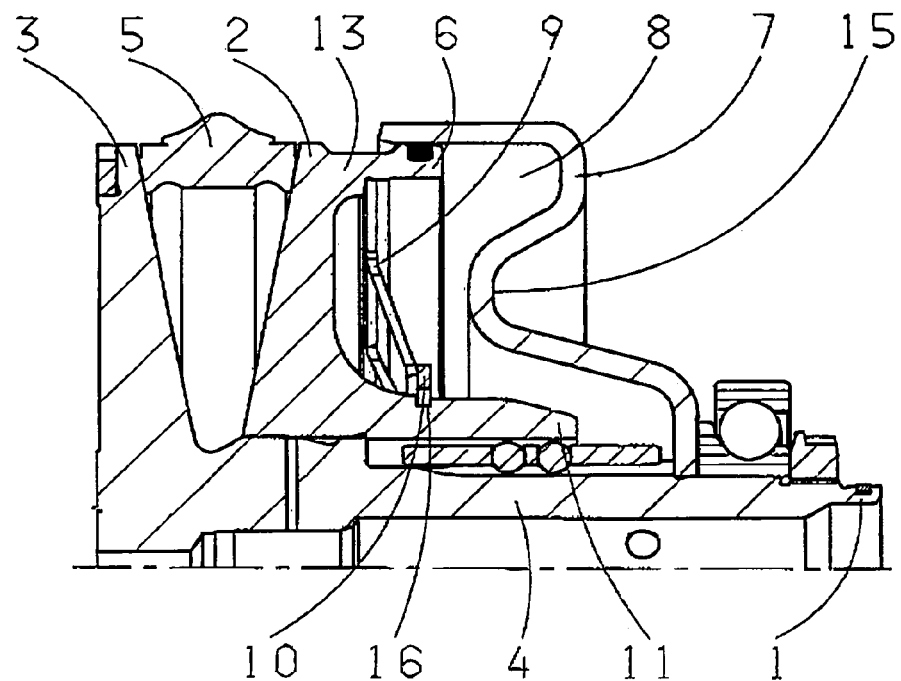
FIG. 1 is a cross-section through a cone pulley CVT in the area of a plate spring acting on the axially displaceable primary cone pulley at the highest possible ratio.

A CVT transmission essentially comprises one primary or transmission input shaft 1 which can be connected via a starting clutch (not shown) on the transmission input side with the prime mover of a motor vehicle. Upon the transmission input shaft 1 are non-rotatably fastened two cone pulleys 2, 3 of the so-called primary cone pulley set 19, the cone pulley 2 being axially displacably supported upon a bearing section 4 of the primary shaft 1. In addition, between the two cone pulleys 2 and 3 an encircling means 4 is inserted with which the input torque produced by the prime mover can be transmitted to the secondary output 20 shaft of the variator.

To that end, upon the secondary shaft 20 of the CVT is non-rotatably situated a so-called secondary cone pulley set 21 of the two cone pulleys 2', 3' of which one cone pulley 3' is axially firm and the other 2' axially displaceable. The encircling means 4 is accommodated between these two cone pulleys.

To produce upon the encircling means 4, a contact pressure that makes it possible to transmit the torque from the primary cone pulley 19 set to the secondary cone pulley set 21, the same as a ratio-changing pressure, the axially displaceable cone pulleys 2, 2' with their side axially remote from the encircling means 4 are designed as pistons 6, 6' which are axially displaceable into respective coordinated pressure cylinders 7, 7'. In relation to this, to exert a contact or adjusting force, hydraulic oil is introduced under pressure during operation of the transmission into the pressure chamber 8, 8' of said piston-cylinder arrangements by hydraulic devices 22 supplied with pressurized hydraulic fluid from a hydraulic pressure supply 23.

According to FIGS. 1, 3, 4 and 5, within the pressure chamber 8 is located one recoil spring designed as plate spring 9 which supports itself axially, on one side, on a section (surface) 13 close to the encircling means of the axially displaceable cone pulley 2 and, on the other side, on a guard ring 10.

Figure 5:
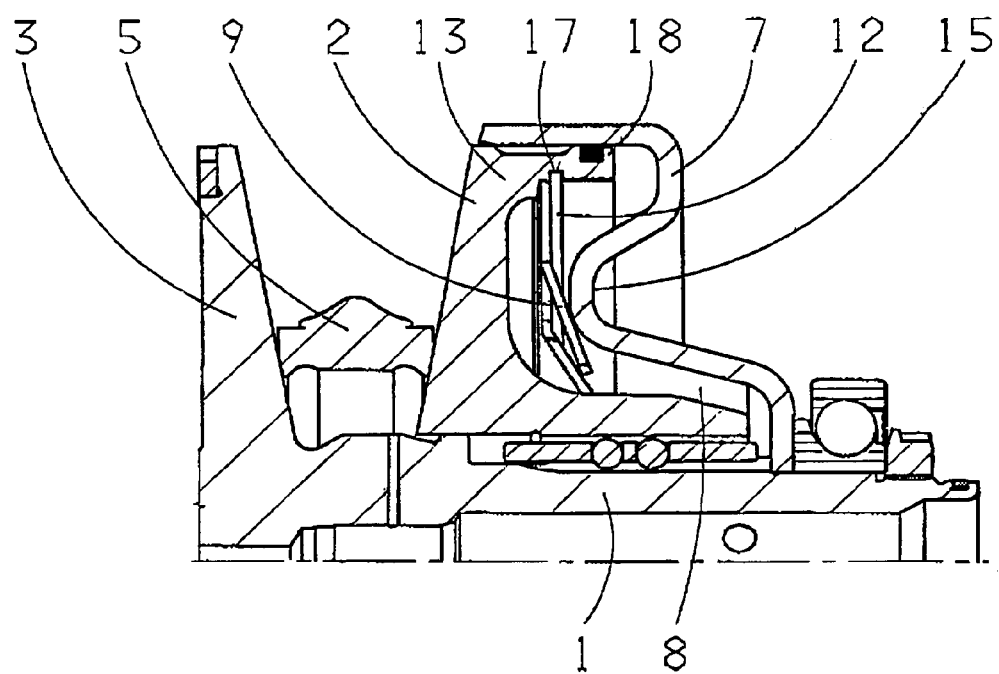
FIG. 5 is a figure similar to FIG. 1 with a radially outwardly disposed guard ring for the plate spring.
Figure 6:
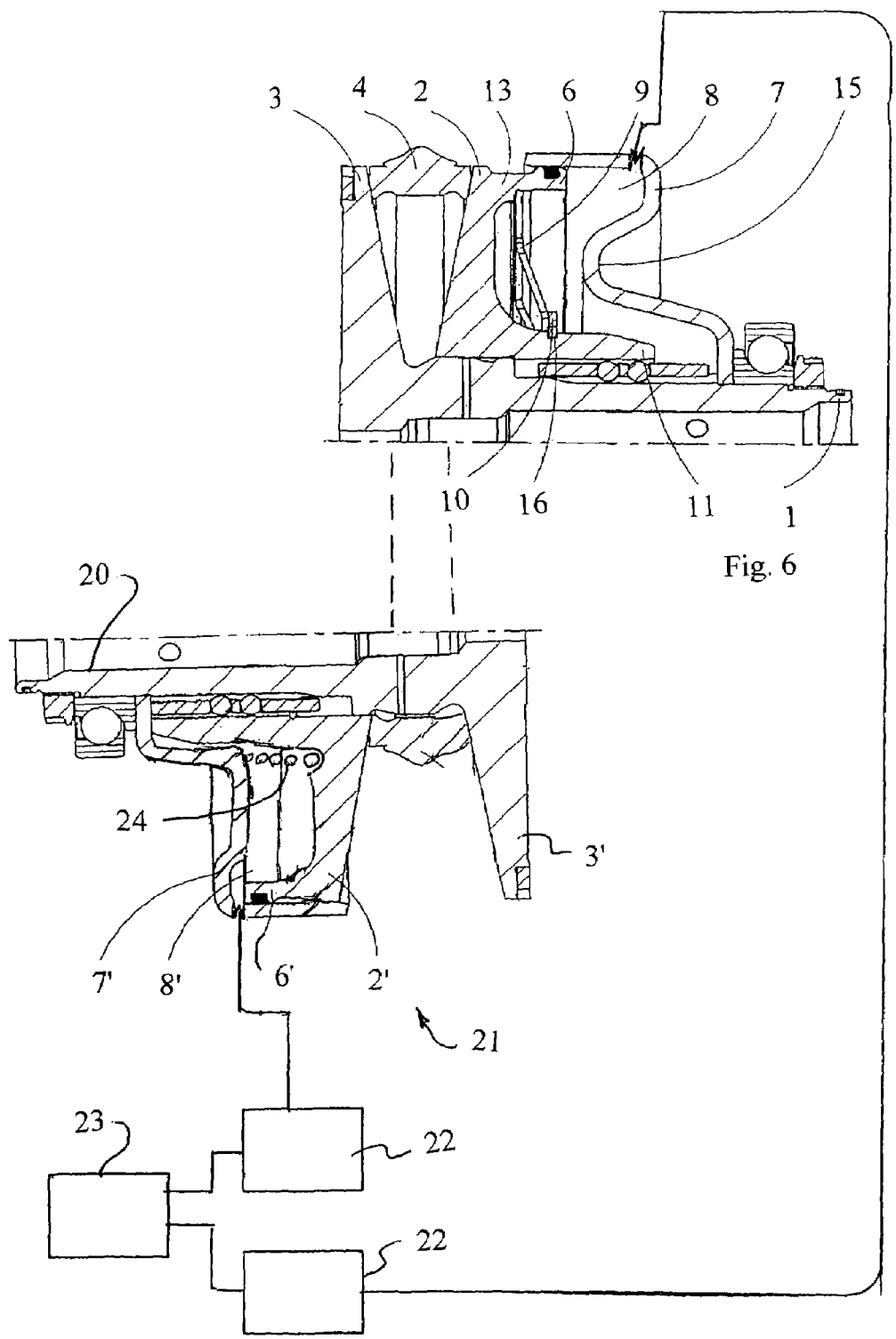
FIG. 6 is a diagrammatic illustration of a continuously variable Transmission.

In the embodiment shown in FIG. 1 and FIG. 6, the guard ring 10 is inserted in an annular groove 16 of the bearing section 11 of the cone pulley 2 while in the development of the invention shown in FIG. 5 such a guard ring 12 is fastened in an annular groove 17 on the cylinder-side guide section 18.

Figure 2:
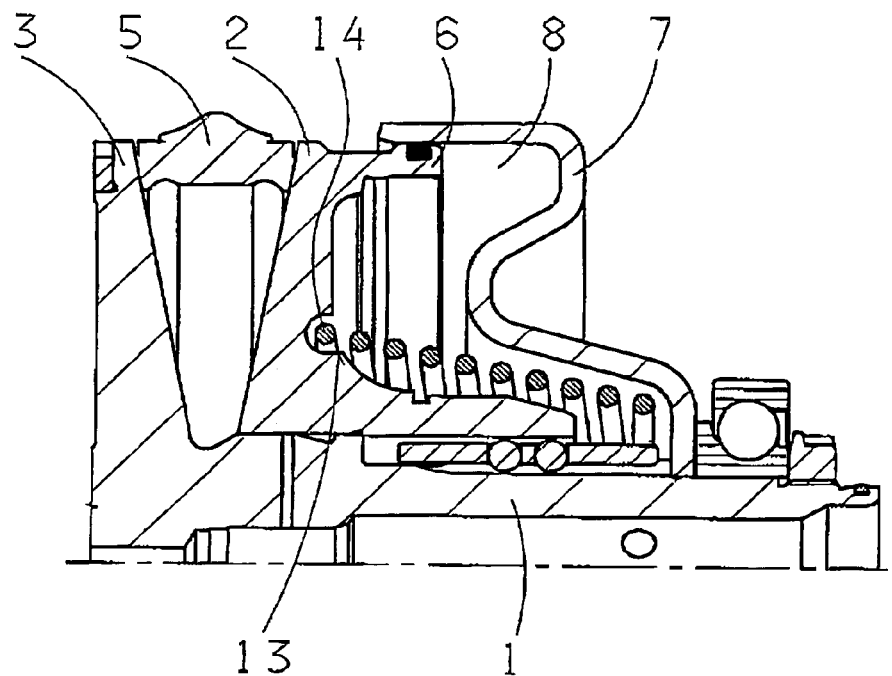
FIG. 2 is a figure similar to FIG. 1, but with a coil spring.
Figure 3:
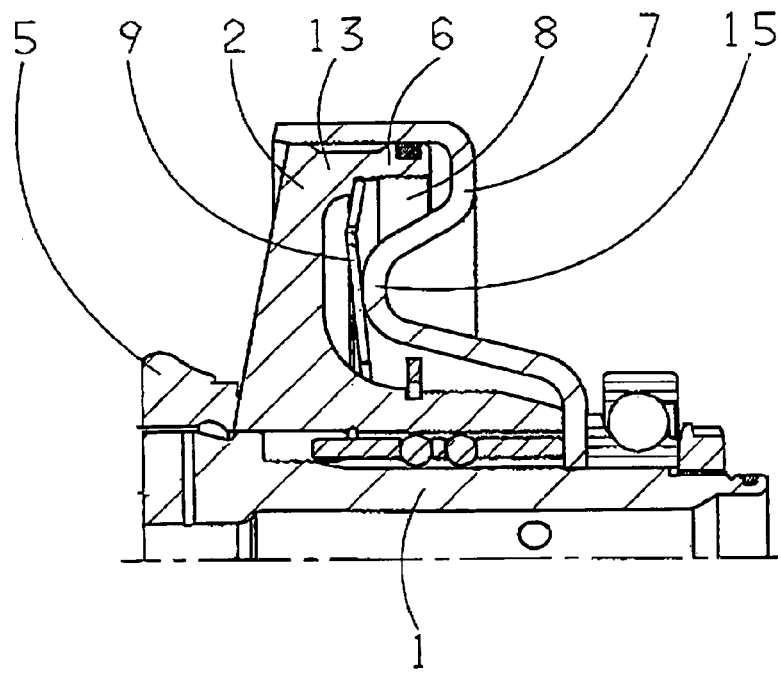
FIG. 3 is a figure similar to FIG. 1 at the lowest possible ratio.

According to the alternative shown in FIG. 2, it is possible to use a coil spring 14 instead of the plate spring 9, so as to exert, a ratio-changing active axial force upon the axially displaceable cone pulley 2, in case of failure of the static hydraulic pressure.

In relation to the invention, it is now important to mention that upon the axially displaceable secondary cone pulley 2' disposed on the secondary shaft 20, likewise, acts one recoil spring 24 with which the transmission, in pressureless state of the secondary-side piston-cylinder arrangement, substantially in case of arrest of the vehicle or of a defect of the prime mover, without the action of the primary-side recoil spring 9, would be adjusted to the ratio LOW. In this reduction ratio, the two primary cone pulleys 2, 3 are moved the farthest from each other so that in a concrete cone pulley CVT, a reduction ratio, for example of 1:0.4 appears.

Figure 4:
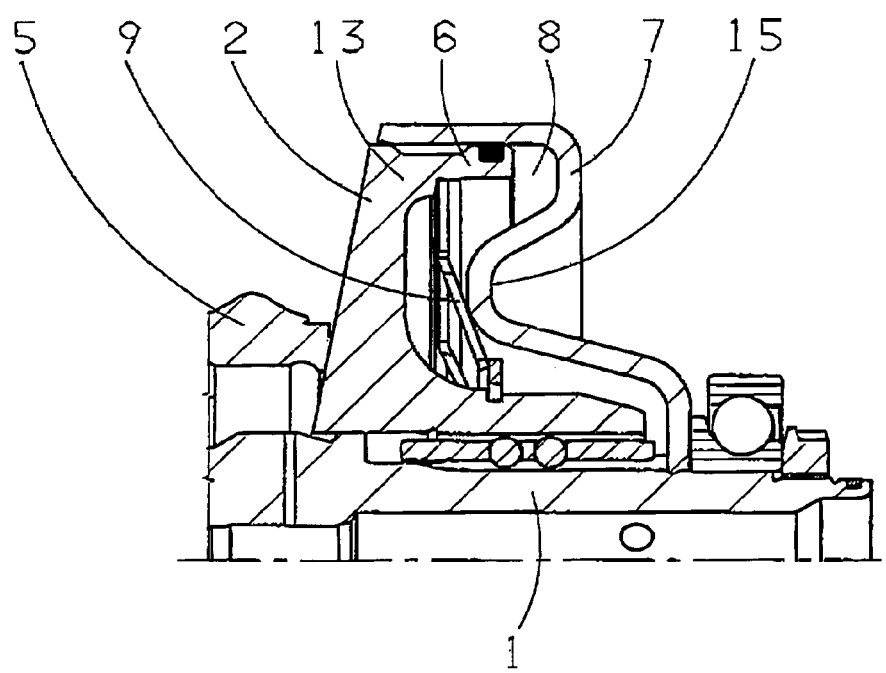
FIG. 4 is a figure similar to FIG. 1, at a towing reduction ratio.

As long as the pressure 23 medium supply for the piston-cylinder arrangement 8, 8' of the two axially displaceable cone pulleys 2, 2' is inactive, due to stoppage or to a defect of the vehicle prime mover, the towing reduction ratio shown in FIG. 4 appears as result of the balance of forces then active between the recoil springs on the axially displaceable secondary cone pulley and the recoil springs 9, 14 on the axially movable primary cone pulley.

As shown in this connection by a comparison, especially of FIG. 1 with FIG. 4, the plate spring 9 comes to abut with recoiling effect on a section (portion or surface) 15 of the pressure cylinder 7 pointing axially in a direction to the encircling means 5 only when the cone pulleys 2, 3 of the primary cone pulley set 2, 3 have a predetermined axial distance from each other.

At the same time, the plate spring 9, while supported on the bearing section 15 of the pressure cylinder 7, presses the cone pulley 2 axially so far in direction to the stationary cone pulley 3 that the encircling means 5 is positioned removed from its smallest and largest tread radius in this cone pulley set. In a concrete cone pulley CVT, the characteristic liens of the recoil springs on the primary and secondary sides are coordinated for the movable cone pulleys preferably so that in such a towing phase the transmission ratio assumes a value of 1:1.5.

It is achieved by the transmission design described that already at the start of a towing operation such a reduction ratio of the transmission is adjusted that inadmissibly high rotational speeds of the primary shaft cannot be generated. It can thus be reliably prevented that the starting clutch becomes abnormally closed due to dynamic pressure medium forces and/or that the primary cone pulleys suffer mechanical damages on account of a skidding of the encircling means 5.

Contrary to that, the primary-side spring device known from DE 100 52 471 A1, only takes care that when the prime mover is stationary and the transmission, if necessary, is still loaded with hydraulic pressure, a force is exerted upon the displaceable primary cone pulley that extricates the transmission from the underdrive adjustment LOW and leads it to a reduction ratio 1:1 only during the towing operation.

REFERENCE NUMERALS 1 primary shaft
2 axially movable primary cone pulley
3 undisplacable primary cone pulley
4 bearing section of the primary shaft
5 encircling means
6 piston
7 pressure cylinder
8 pressure chamber
9 spring device, plate spring
10 guard ring
11 bearing section of primary cone pulley
12 guard ring
13 cylinder-side section of primary cone pulley
14 spring device, coil spring
15 bearing section of the cylinder
16 groove
17 groove
18 guide section

The invention claimed is:
1. A continuously variable transmission comprising:
an input cone pulley pair on an input shaft and an output cone pulley pair on an output shaft wherein each cone pulley pair includes
  a fixed cone pulley axially fixed to a corresponding one of the input shaft and the output shaft, and
  a moveable cone pulley axially displaceable on the corresponding one of the input shaft and the output shaft to control a spacing between the fixed cone pulley and the moveable cone pulley,
an encircling mechanism spanning the input and the output cone pulley pairs to transfer torque between the input and the output cone pulley pairs at a transmission ratio proportional to a ratio of the spacings between the cone pulleys of the input and the output cone pulley pairs and being variable between a low transmission ratio range and a high transmission ratio range,
hydraulic devices connected with a hydraulic pressure supply for axially displacing the moveable cone pulleys of the input and the output cone pulley pairs in opposing directions to control the spacings between the respective cone pulleys of the input and the output cone pulley pairs, and
in the high transmission ratio range of the input moveable cone pulley, a recoil spring solely engages the input moveable cone pulley and a contact surface fixed to the moveable cone pulley such that no force is exerted on the moveable cone pulley and, in the low transmission ratio range of the input moveable cone pulley, the recoil spring exerts a spring force on the input moveable cone pulley to axially displace the input moveable cone pulley toward the high transmission ratio range, an axially fixed contact surface and the input moveable cone pulley at least partially defining a pressure chamber, and the recoil spring being located within the pressure chamber, and
in a deactivated state of the hydraulic pressure supply, the spring force of the recoil spring is sufficient to axially displace the input moveable cone pulley toward the high transmission ratio range.

2. The continuously variable transmission according to claim 1, wherein the recoil spring (9, 14) is a plate spring (9).

3. A continuously variable transmission comprising:
an input cone pulley pair on an input shaft and an output cone pulley pair on an output shaft,
  the input cone pulley pair comprising a fixed cone pulley axially fixed to the input shaft and a moveable cone pulley axially displaceable along the input shaft for controlling a relative spacing between the fixed cone pulley and the moveable cone pulley,
  the output cone pulley pair comprising a fixed cone pulley axially fixed to the output shaft and a moveable cone pulley axially displaceable along the output shaft for controlling a relative spacing between the fixed cone pulley and the moveable cone pulley,
an encircling mechanism spanning the input and the output cone pulley pairs for transferring torque from the input to the output cone pulley pairs at a transmission ratio proportional to a ratio of the spacings between the cone pulleys of the input and the output cone pulley pairs and variable between a low transmission ratio range and a high transmission ratio range,
an input hydraulic device connected to a hydraulic pressure supply for axially displacing the moveable pulley of the input cone pulley pair between the low transmission ratio range and the high transmission ratio range and an output hydraulic device connected to the hydraulic pressure supply for axially displacing the moveable pulley of the output cone pulley pair between the low transmission ratio range and the high transmission ratio range, and
in the high transmission ratio range of the input moveable cone pulley, a recoil spring solely engages the input moveable cone pulley and a contact surface fixed to the input moveable cone pulley such that no force is exerted on the input moveable cone pulley and, in the low transmission ratio range, spring exerts a spring force on the input moveable cone pulley in a direction axially displacing the input moveable cone pulley toward the high transmission ratio range, an axially fixed contact surface and the input moveable cone pulley at least partially defining a pressure chamber, and the recoil spring being located within the pressure chamber; and
in a deactivated state of the hydraulic pressure supply, the spring force of the recoil spring is sufficient to axially displace the input moveable cone pulley to the high transmission ratio range.

4. A continuously variable transmission comprising:
an input shaft (1) having a first cone pulley (3) axially fixed on the input shaft (1);
a second cone pulley (2) being supported by the input shaft (1) so as to be axially moveable between a first transmission ratio position and a second transmission ratio position;
an encircling mechanism (5) sandwiched between the first cone pulley (3) and the second cone pulley (2) and communicating with an output pulley pair, supported by an output shaft, for transmitting drive from the input shaft (1) to the output shaft;
a pressure cylinder (7) and the second cone pulley (2) at least partially defining a pressure chamber (8);
a spring element (9) being located within the pressure chamber (8), the spring element (9) being solely fixed, at a first end thereof, to an outer diameter of the second cone pulley (2) and, in the first transmission ratio position of the second cone pulley (2). an opposed second end of the spring element (9) abuts against a surface fixed to an inner diameter of the second cone pulley (2); and
in either the second transmission ratio position and an intermediate transmission ratio position, between the first and the second transmission ratio positions, a portion (15) of the pressure cylinder (7) engages with an intermediate section of the spring element (9) to bias the spring element (9) toward the first transmission ratio position.

5. The continuously variable transmission according to claim 4, wherein the first end of the spring element (9) axially engages a shoulder (13) of the second cone pulley (2) and in the first transmission ratio position of the second cone pulley (2), the second end of the spring element (9) axially abuts a guard ring (10), which is axially fixed in a groove (16) in the inside diameter of the second cone pulley (2), to axially secure the spring element (9).

6. The continuously variable transmission according to claim 4, wherein the transmission has, in the second transmission ratio position, a ratio reduction of approximately 1:0.4 between the input shaft (1) and the output shaft.

7. The continuously variable transmission according to claim 4, wherein the transmission has, in the first transmission ratio position, a transmission ratio of approximately 1:1.5 between the input shaft (1) and the output shaft.

8. The continuously variable transmission according to claim 4, wherein a pressure in the pressure chamber (8) is controlled to axially bias the second cone pulley (2) between the first transmission ratio position and the second transmission ratio position.

9. The continuously variable transmission according to claim 4, wherein the spring element (9) is located axially between the second cone pulley (2) and the pressure cylinder (7).

10. The continuously variable transmission according to claim 4, wherein the spring element (9) is at least partially located within an annular recess formed in the second cone pulley (2).

* * * * *